US009203249B2

(12) United States Patent
Noda et al.

(10) Patent No.: US 9,203,249 B2
(45) Date of Patent: Dec. 1, 2015

(54) BATTERY PACK FOR ELECTRIC POWER TOOL, CONTROL CIRCUIT, AND PROGRAM

(75) Inventors: Masafumi Noda, Anjo (JP); Hitoshi Suzuki, Anjo (JP); Hisakazu Okabayashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 478 days.

(21) Appl. No.: 13/642,228

(22) PCT Filed: Apr. 21, 2011

(86) PCT No.: PCT/JP2011/059815
§ 371 (c)(1),
(2), (4) Date: Oct. 19, 2012

(87) PCT Pub. No.: WO2011/132732
PCT Pub. Date: Oct. 27, 2011

(65) Prior Publication Data
US 2013/0033233 A1   Feb. 7, 2013

(30) Foreign Application Priority Data
Apr. 21, 2010   (JP) ................................ 2010-098324

(51) Int. Cl.
*H02J 7/00* (2006.01)
*H01M 10/44* (2006.01)
(Continued)

(52) U.S. Cl.
CPC ............. *H02J 7/0036* (2013.01); *H01M 10/44* (2013.01); *H01M 10/48* (2013.01); *H02J 7/0063* (2013.01); *H02J 9/005* (2013.01); *H02J 2007/004* (2013.01); *H02J 2007/0067* (2013.01)

(58) Field of Classification Search
USPC ................................................ 320/134–136
See application file for complete search history.

(56) References Cited

U.S. PATENT DOCUMENTS 5,783,998 A * 7/1998 Nakajou et al. ........... 340/636.15
6,208,117 B1 * 3/2001 Hibi .............................. 320/134
(Continued)

FOREIGN PATENT DOCUMENTS

GB    2 388 481 A    11/2003
JP    A-7-296856    11/1995
(Continued)

OTHER PUBLICATIONS

Oct. 22, 2013 Japanese Office Action issued in Japanese Application No. 2010-098324 (with translation).
(Continued)

*Primary Examiner* — Samuel Berhanu
(74) *Attorney, Agent, or Firm* — Oliff PLC

(57) ABSTRACT

A battery pack for electric power tool is provided with a battery and a control circuit. The circuit includes a condition satisfaction determination unit, a continuation satisfaction determination unit, and a sleep-mode transition unit. The condition satisfaction determination unit determines whether each of at least one predetermined sleep-mode transition condition is satisfied, and determines whether an all-condition satisfaction state is present, which is a state wherein all of the at least one sleep-mode transition condition are satisfied. The continuation satisfaction determination unit determines whether the all-condition satisfaction state has continued for a predetermined period of time when the condition satisfaction determination unit determines that the all-condition satisfaction state is present. The transition unit stops part of operation of the circuit to shift the circuit to a sleep mode when the continuation satisfaction determination unit determines that the all-condition satisfaction state has continued for the predetermined period of time.

7 Claims, 8 Drawing Sheets

(51) Int. Cl.
*H01M 10/48* (2006.01)
*H02J 9/00* (2006.01)

(56) References Cited

U.S. PATENT DOCUMENTS

| | | | |
|---|---|---|---|
| 6,924,624 B2 * | 8/2005 | Baur et al. | 320/132 |
| 2003/0137279 A1 | 7/2003 | Baur et al. | |
| 2004/0239293 A1 | 12/2004 | Mori et al. | |
| 2006/0214627 A1 | 9/2006 | Ito et al. | |
| 2007/0108941 A1 | 5/2007 | Sainomoto et al. | |
| 2008/0111520 A1 * | 5/2008 | Sasaki | 320/134 |
| 2010/0085010 A1 | 4/2010 | Suzuki et al. | |

FOREIGN PATENT DOCUMENTS

| | | |
|---|---|---|
| JP | A-08-308121 | 11/1996 |
| JP | A-11-191931 | 7/1999 |
| JP | A-2003-264008 | 9/2003 |
| JP | A-2004-74298 | 3/2004 |
| JP | A-2004-304940 | 10/2004 |
| JP | A-2004-312789 | 11/2004 |
| JP | A-2006-129544 | 5/2006 |
| JP | A-2006-198690 | 8/2006 |
| JP | A-2006-280043 | 10/2006 |
| JP | A-2006-341325 | 12/2006 |
| JP | A-2007-143285 | 6/2007 |
| JP | A-2008-125268 | 5/2008 |
| JP | A-2010-93953 | 4/2010 |
| JP | A-2010-115087 | 5/2010 |
| JP | A-2010-158743 | 7/2010 |
| JP | A-2010-162656 | 7/2010 |

OTHER PUBLICATIONS

Aug. 2, 2011 International Search Report issued in International Patent Application No. PCT/JP2011/059815.
Nov. 6, 2012 International Preliminary Report on Patentability issued in International Patent Application No. PCT/JP2011/059815.

* cited by examiner

BATTERY PACK FOR ELECTRIC POWER TOOL, CONTROL CIRCUIT, AND PROGRAM

CROSS-REFERENCE TO RELATED APPLICATIONS

This international application claims the benefit of Japanese Patent Application No. 2010-098324 filed Apr. 21, 2010 in the Japan Patent Office, and the entire disclosure of which is incorporated herein by reference.

TECHNICAL FIELD

The present invention relates to a battery pack that is used as a power source for electric power tool.

BACKGROUND ART

A battery pack for electric power tool using a battery constituted of, for example, a lithium-ion rechargeable battery (hereinafter, also referred to merely as a "battery pack") usually includes a control circuit which receives power supply from the battery to operate in order to implement various functions, such as controlling charge and discharge of the battery, monitoring the state of the battery, and so on.

Since there is a need to monitor the state of the battery even when the battery pack is not in use, the control circuit is generally configured to operate at all times by receiving power supply from the battery. Therefore, remaining amount of power of the battery gradually decreases even if electric power is not supplied to the body of the electric power tool. Battery capacity becomes empty in a relatively short period of time.

In contrast, a technique is known which completely cuts off power supply to the control circuit from the battery when the battery pack is not in use in order to make the battery last as long as possible (for example, See Patent Document 1 below).

Patent Document 1 describes that, when a load is disconnected from a storage battery, internal circuits in the storage battery are operated at low power consumption for a predetermined period of time and, after the predetermined time has elapsed, supply of energy fed to the internal circuits from cells in the storage battery is completely stopped so as to completely stop circuit operation.

PRIOR ART DOCUMENTS

Patent Documents

Patent Document 1: Japanese Unexamined Patent Application Publication No. 2003-264008

SUMMARY OF THE INVENTION

Problems to be Solved by the Invention

In the technique described in Patent Document 1, operation at low power consumption is started as soon as the load is cut off from the storage battery. However, this is not much preferred from a viewpoint of battery protection.

Particularly, operation at low power consumption somewhat reduces an ability to monitor and control the battery. Therefore, if a user is using an electric power tool while intermittently turning on and off a switch, for example, internal circuits of the storage battery are shifted to operate at low power consumption once the switch is turned off, although the electric power tool is substantially in a state of continuous use. This is not desirable from the viewpoint of battery protection.

Furthermore, in the technique described in Patent Document 1, in order for power saving of the storage battery, power supply to the circuits inside the storage battery is completely shut down after a predetermined time has elapsed since disconnection of the load. Therefore, when an attempt is made to use the tool again after the complete disconnection of power supply, rapid start of the operation of the tool is hindered. There is a risk that convenience of the tool may be impaired.

The present invention has been made in view of the above problems. One object of the present invention is to provide a technique which can effectively reduce power consumption in a battery pack for electric power tool, while a desired monitoring function for the battery pack or convenience of the electric power tool is maintained.

Means for Solving the Problems

A battery pack for electric power tool in a first aspect of the present invention, which has been made to solve the above problems, is a battery pack which supplies electric power to a body of the electric power tool, and includes a battery that has at least one battery cell, and a control circuit that is operated by the electric power of the battery and has a function to monitor at least a state of the battery.

The control circuit includes a condition satisfaction determination unit, a continuity satisfaction determination unit, and a sleep-mode transition unit. The condition satisfaction determination unit determines whether or not each of at least one predetermined sleep-mode transition condition is satisfied, and also determines whether or not an all-condition satisfaction state is present, which is a state wherein all of the at least one sleep-mode transition condition are satisfied. When it is determined by the condition satisfaction determination unit that the all-condition satisfaction state is present, the continuity satisfaction determination unit determines whether or not the all-condition satisfaction state has continued for a predetermined period of time. When it is determined by the continuity satisfaction determination unit that the all-condition satisfaction state has continued for the predetermined period of time, the sleep-mode transition unit stops part of operation of the control circuit to shift the control circuit to a sleep mode.

According to the battery pack configured as above, at least one sleep-mode transition condition is set as a condition for transition to the sleep mode. However, even if all the conditions are satisfied, the control circuit is not immediately shifted to the sleep mode upon satisfaction of the conditions, but continues to be operated as normal until the predetermined period of time elapses. Then, when the all-condition satisfaction state which is the state wherein all of the at least one sleep-mode transition condition are satisfied has continued for the predetermined period of time, the control circuit is shifted to the sleep mode.

Moreover, the sleep mode of the present invention is not configured to completely stop power supply to the control circuit and all its operation, but is configured to stop part of the operation of the control circuit. For this reason, it is also possible, for example, to maintain at least part of the monitoring function for the battery the control circuit has even during the operation in the sleep mode.

Therefore, according to the battery pack of the present invention, it is possible to make the control circuit in the battery pack operate at low power consumption (sleep mode) at timing appropriate to usage of the battery pack. Thereby, while the desired monitoring function and convenience of electric power tool are maintained, effective reduction in power consumption can be achieved.

Here, there can be various particular contents of the at least one sleep-mode transition condition. For example, the at least one sleep-mode transition condition may include at least one of conditions (a) to (e) below:

(a) a charger unconnected state is present, which is a state wherein the battery pack is not connected to a charger for charging the battery;
(b) a non-discharging state is present, which is a state wherein a discharge current is not flowing from the battery to the body of the electric power tool;
(c) a charging unexecuted state is present, which is a state wherein a charging current for charging the battery is not flowing;
(d) an operation switch-off state is present, which is a state wherein an operation switch that is provided in the body of the electric power tool to which the battery pack is attached and which receives power supply from the battery to operate, and that is externally operated in order to operate or stop the body of the electric power tool, is turned off; and
(e) an overloaded state is not present, which is a state wherein there is a risk that overcurrent which is equal to or larger than a predetermined overcurrent threshold may flow from the battery to the body of the electric power tool when the operation switch is turned on.

According to the battery pack configured in this way, status of use of the battery pack can be properly and easily determined. Based on a result of the determination, the control circuit is shifted to the sleep mode. In other words, it is possible to shift the control circuit to the sleep mode at more appropriate timing according to the usage of the battery pack.

Among the above conditions (a) to (e), how many or which condition to include in the at least one sleep-mode transition condition can be arbitrarily determined. However, for example, if either two or more conditions are set as the sleep-mode transition condition, it is possible to more accurately determine whether or not the control circuit is in a state wherein the control circuit may be shifted to the sleep mode, as compared with a case in which only one condition is set.

Further, if all of the above conditions (a) to (e) are included in the sleep-mode transition condition, for example, it is possible to more accurately determine whether or not the control circuit is in a state wherein the control circuit may be shifted to the sleep mode, and thus more preferable.

Here, for example, if at least the above condition (a) is set as the sleep-mode transition condition, and if the charger is configured to output a charger signal which indicates that the charger is in a state wherein the charger can supply electric power at least for charging to the battery pack, the battery pack when the charger is in the state can be configured more specifically as follows. Particularly, the battery pack includes a charger signal input terminal to which the charger signal outputted from the charger is inputted. Also, the control circuit includes a charger signal input detection unit that detects an input of the charger signal to the charger signal input terminal. The condition satisfaction determination unit, when an input of the charger signal is not detected by the charger signal input detection unit, determines that the charger unconnected state is present and at least the condition (a) is satisfied.

According to the battery pack configured in this way, it can be reliably determined that the above condition (a) has been satisfied, that it, the charger unconnected state is present, by a simple method based on presence or absence of a charger signal from the charger.

For example, if at least the condition (b) is set as the sleep-mode transition condition, the battery pack can be configured more specifically as follows. Particularly, the control circuit includes a discharge current detection unit that detects a discharge current from the battery. The condition satisfaction determination unit, when the discharge current is not detected by the discharge current detection unit, determines that a non-discharging state is present.

According to the battery pack configured in this way, it can be reliably determined that the above condition (b) has been satisfied, that is, the non-discharging state is present, by a simple method based on a result of the detection by the discharge current detection unit.

For example, if at least the condition (c) is set as the sleep-mode transition condition, the battery pack can be configured more specifically as follows. Particularly, the control circuit includes a charging current detection unit that detects a charging current to the battery. The condition satisfaction determination unit, when the charging current is not detected by the charging current determination unit, determines that the charging unexecuted state is present.

According to the battery pack configured in this way, it can be reliably determined that the above condition (c) has been satisfied, that is, the charging unexecuted state is present by a simple method based on a result of the detection by the charging current detection unit.

For example, if at least the above condition (d) is set as the sleep-mode transition condition, and if the body of the electric power tool is configured to be able to output an operation signal indicating an operation state of the operation switch, the battery pack can be configured more specifically as follows. Particularly, the battery pack includes an operation signal input terminal to which an operation signal outputted from the body of the electric power tool is inputted. Also, the control circuit includes an operation signal detection unit that detects an operation signal inputted to the operation signal input terminal. The condition satisfaction determination unit determines the operation state of the operation switch based on the operation signal detected by the operation signal detection unit, and, when it is determined that the operation switch is turned off, determines that the operation switch-off state is present.

According to the battery pack configured in this way, it can be reliably determined that the above condition (d) has been satisfied, that is, the operation switch-off state is present by a simple method based on the operation signal from the body of the electric power tool.

For example, if at least the above condition (e) is set as the sleep-mode transition condition, the battery pack can be configured more specifically as follows. Particularly, the control circuit includes a discharge current detection unit, an overcurrent determination unit, and a load information generation unit. The discharge current detection unit detects a discharge current from the battery. The overcurrent determination unit determines whether or not the discharge current detected by the discharge current detection unit is equal to or larger than an overcurrent threshold at predetermined timing. The load information generation unit generates load information indicating whether or not an overloaded state is present based on a result of the determination by the overcurrent determination unit, each time the determination by the overcurrent determination unit is made. The condition satisfaction determination unit determines whether or not the overloaded state is present based on the load information generated by the load information generation unit.

Particularly, at predetermined timing, it is determined whether or not the overloaded state is present based on a value of the discharge current at the time. Each time the determination is made, load information (indicating whether or not the overloaded state is present) is generated based on a result of the determination. Then, upon determining the sleep-mode transition condition, satisfaction of the above condition (e) is determined based on the load information generated at the time.

Therefore, according to the battery pack configured in this way, whether or not the above condition (e) is satisfied, i.e., whether or not the overloaded state is present, can be reliably determined by a simple method based on the load information.

In this case, there can be various ways to generate the load information. For example, the load information can be generated as follows. Particularly, the overcurrent determination unit periodically determines whether or not the discharge current detected by the discharge current detection unit is equal to or larger than the overcurrent threshold. The control circuit includes an add-subtract value setting unit. The add-subtract value setting unit, when it is determined by the overcurrent determination unit that the discharge current is not equal to or larger than the overcurrent threshold, sets a negative add-subtract value including zero (0) of which absolute value becomes larger as the discharge current is smaller. When it is determined by the overcurrent determination unit that the discharge current is equal to or larger than the overcurrent threshold, the add-subtract value setting unit sets a positive add-subtract value which becomes larger as the discharge current is larger. The load information generation unit, each time the determination by the overcurrent determination unit is made, cumulatively adds the add-subtract value set by the add-subtract value setting unit based on a result of the determination, thereby to generate a result of the addition as the load information. The condition satisfaction determination unit, when the result of the addition as the load information generated by the load information generation unit is equal to or smaller than a predetermined overload determination threshold, determines that an overloaded state is not present.

According to the battery pack configured in this way, the add-subtract value set in accordance with the value of the detected discharge current is cumulatively added periodically. Also, the cumulatively added value is periodically updated (cumulatively added) to be larger as the detected discharge current value is larger, and to be smaller as the discharge current value is smaller in reverse. Therefore, it is possible to accurately determine whether or not the overloaded state is present based on the cumulatively added value.

Next, a control circuit in a second aspect of the present invention is provided in a battery pack for electric power tool which includes a battery having at least one battery cell. The control circuit includes a condition satisfaction determination unit, a continuity satisfaction determination unit, and a sleep-mode transition unit. The condition satisfaction determination unit determines whether or not each of at least one predetermined sleep-mode transition condition is satisfied, and also determines whether or not an all-condition satisfaction state is present, which is a state wherein all of the at least one sleep-mode transition condition are satisfied. When it is determined by the condition satisfaction determination unit that the all-condition satisfaction state is present, the continuity satisfaction determination unit determines whether or not the all-condition satisfaction state has continued for a predetermined period of time. When it is determined by the continuity satisfaction determination unit that the all-condition satisfaction state has continued for the predetermined period of time, the sleep-mode transition unit stops part of operation of the control circuit to shift the control circuit to a sleep mode.

In other words, this control circuit can function as the control circuit of the battery pack in the first aspect.

Now, a program in a third aspect of the present invention is executed in a computer provided in a battery pack for electric power tool which includes a battery having at least one battery cell. By this program, the computer executes a condition satisfaction determination step, a continuity satisfaction determination step, and a sleep-mode transition step. In the condition satisfaction determination step, it is determined whether or not each of at least one predetermined sleep-mode transition condition is satisfied, and also determined whether or not all-condition satisfaction state is present, which is a state wherein all of the at least one sleep-mode transition condition are satisfied. When it is determined in the condition satisfaction determination step that the all-condition satisfaction state is present, it is determined whether or not the all-condition satisfaction state has continued for a predetermined period of time in the continuity satisfaction determination step. When it is determined in the continuity satisfaction determination step that the all-condition satisfaction state has continued for the predetermined period of time, part of operation of the control circuit is stopped to shift the computer to a sleep mode in the sleep-mode transition step.

In other words, by this program, the computer can function as the control circuit of the battery pack in the first aspect.

Here, the above described computer may be a well-known computer, or may be a computer configured suitable for the battery pack for electric power tool.

In addition, the above described program may be stored in a ROM or a backup RAM installed in the computer and may be used by being loaded into the computer from the ROM or the backup RAM. Alternatively, the program may be used by being loaded into the computer through a network.

In addition, the above described program may be used by being recorded in a computer-readable recording medium. Such recording medium includes, for example, a flexible disk (FD), optical disk (MO), DVD, CD-ROM, Blu-Ray disk, HD-DVD, hard disk, portable semiconductor memory (such as a USB memory, memory card, for example), and so on.

EXPLANATION OF REFERENCE NUMERALS

10 . . . electric power tool, 12 . . . power tool body, 14 . . . motor housing, 16 . . . gear housing, 18 . . . drill chuck, 20 . . . hand grip, 22 . . . trigger switch, 24, 82 . . . battery pack attachment portion, 32A, 44A, 84A . . . positive electrode side terminal, 32B, 44B, 84B . . . negative electrode side terminal, 34A, 46A, 46B, 46C, 86B, 86C . . . signal terminal, 36 . . . power supply circuit for control, 38 . . . input and output circuit, 40 . . . battery pack, 42 . . . connector portion, 44, 84 . . . power supply terminal portion, 46, 86 . . . connecting terminal portion, 50 . . . battery, 52A . . . positive electrode side terminal, 52B . . . negative electrode side terminal, 60 . . . battery control circuit, 62 . . . current measurement circuit, 64 . . . voltage measurement circuit, 66 . . . temperature measurement circuit, 68 . . . switch operation detection circuit, 70, 96 . . . MCU, 72 . . . charger detection circuit, 74 . . . power supply circuit for control, 76 . . . shutdown switch, 80 . . . charger, 88 . . . display portion, 92 . . . rectifier circuit, 94 . . . switching power supply circuit for charging, 98 . . . switching power supply circuit for control, 701 . . . CPU, 702 . . . ROM, 703 . . . RAM, 704 . . . memory, 705 . . . input/output port, 706 . . . A/D converter, C1 . . . capacitor, D1 . . . diode, L1A, L2A . . . positive electrode side power supply line, L1B, L2B . . . negative electrode side power supply line, M1 . . . drive motor, Q1-Q4 . . . transistor, R1-R8 . . . resistor, SW1 . . . main switch, ZD1 . . . zener diode

MODE FOR CARRYING OUT THE INVENTION

Hereinafter, a preferred embodiment of the present invention will be described with reference to the drawings.
(Configuration of Entire Electric Power Tool)

Figure 1:
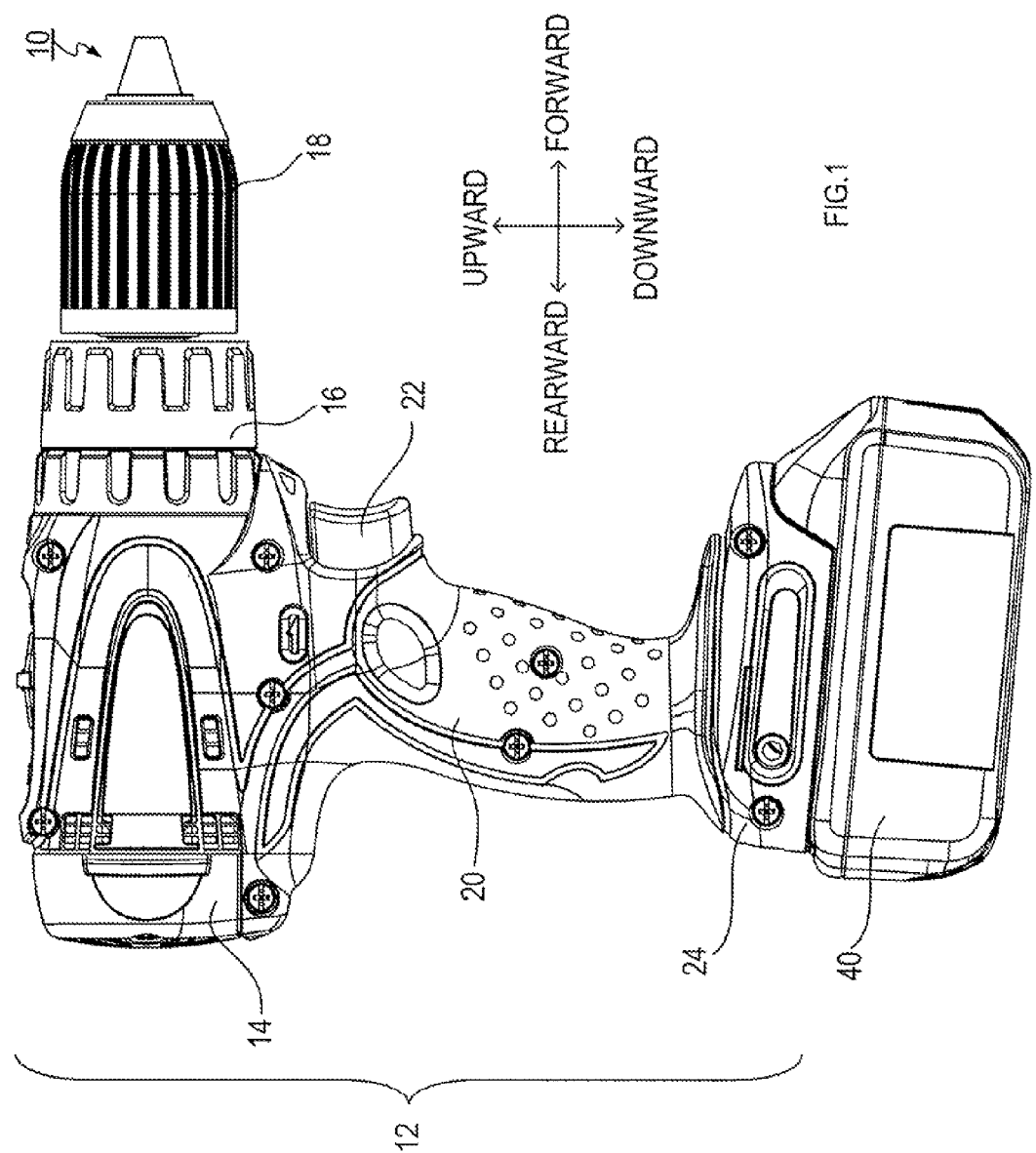
FIG. 1 is a side view showing a battery pack attached to a power tool body of an embodiment.

As shown in FIG. 1, an electric power tool 10 in the present embodiment to which the present invention is applied includes a power tool body 12 (hereinafter referred to as a body 12) configured as a so-called driver drill, and a battery pack 40 detachably attached to the body 12 to supply direct current power to the body 12.

The body 12 includes a motor housing 14, a gear housing 16 located in front of the motor housing 14, a drill chuck 18 located in front of the gear housing 16, and a hand grip 20 located below the motor housing 14.

The motor housing 14 accommodates a drive motor M1 shown in FIG. 4 (hereinafter referred to as a motor M1) which generates a drive force for rotationally driving the drill chuck 18.

The gear housing 16 accommodates a gear mechanism (not shown) which transmits to the drill chuck 18 the drive force of the motor M1.

The drill chuck 18 includes an attachment mechanism (not shown) that detachably attaches a tool bit (not shown) to a front end portion of the drill chuck 18.

The hand grip 20 is formed into a shape to be able to be gripped by a user of the electric power tool 10 with one hand. At a front portion on top of the hand grip 20, a trigger switch 22 (hereinafter referred to as a switch 22) is provided for the user of the electric power tool 10 to drive/stop the motor M1.

At a lower end of the hand grip 20, a battery pack attachment portion 24 (hereinafter referred to as an attachment portion 24) is provided for detachably attaching the battery pack 40 to the body 12.

Figure 2:
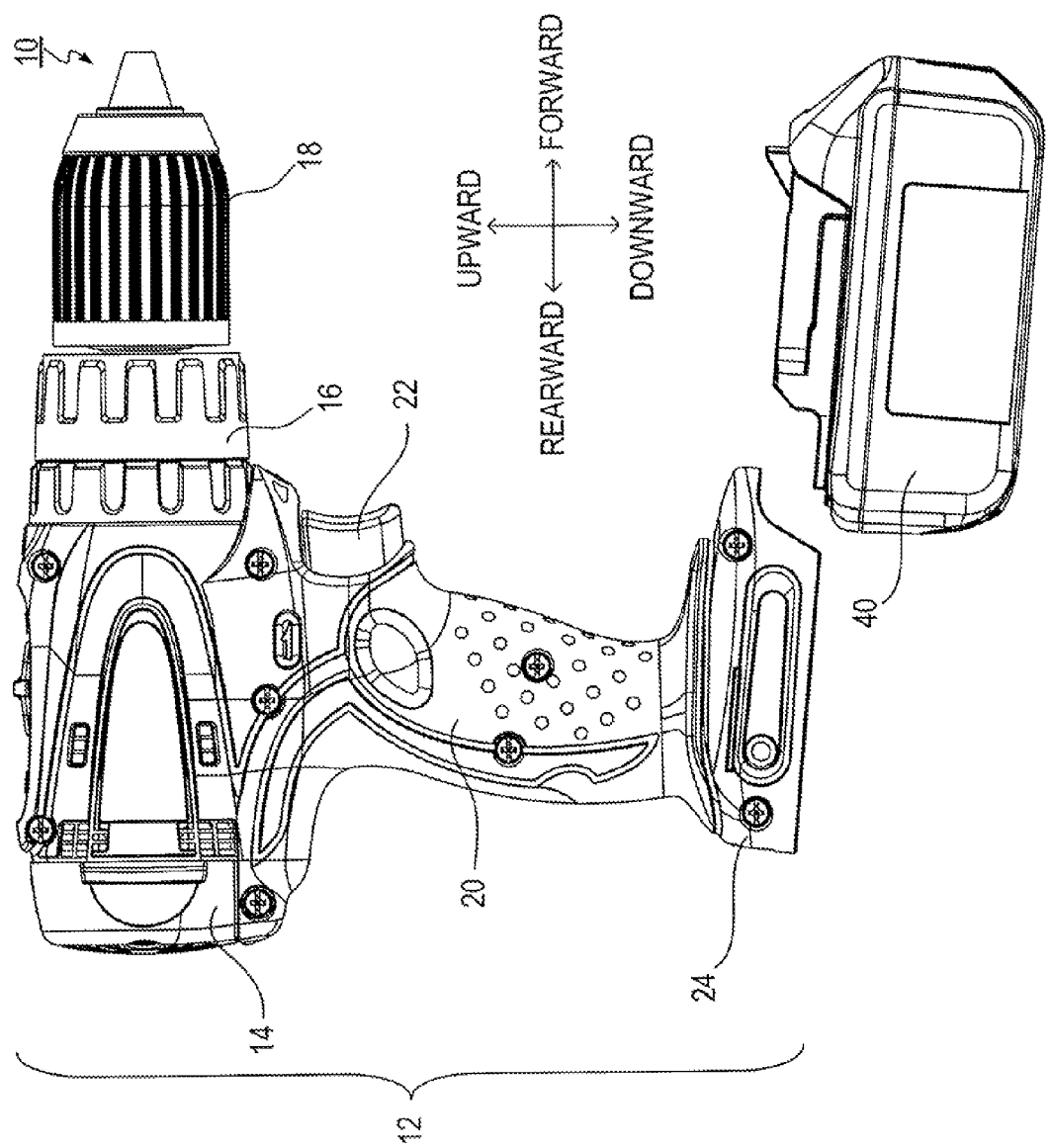
FIG. 2 is a side view showing the battery pack released from the power tool body.

More specifically, as shown in FIG. 2, the attachment portion 24 is configured such that the user of the electric power tool 10 can detach the battery pack 40 from the attachment portion 24 by sliding the battery pack 40 to the front.

Figure 3A:
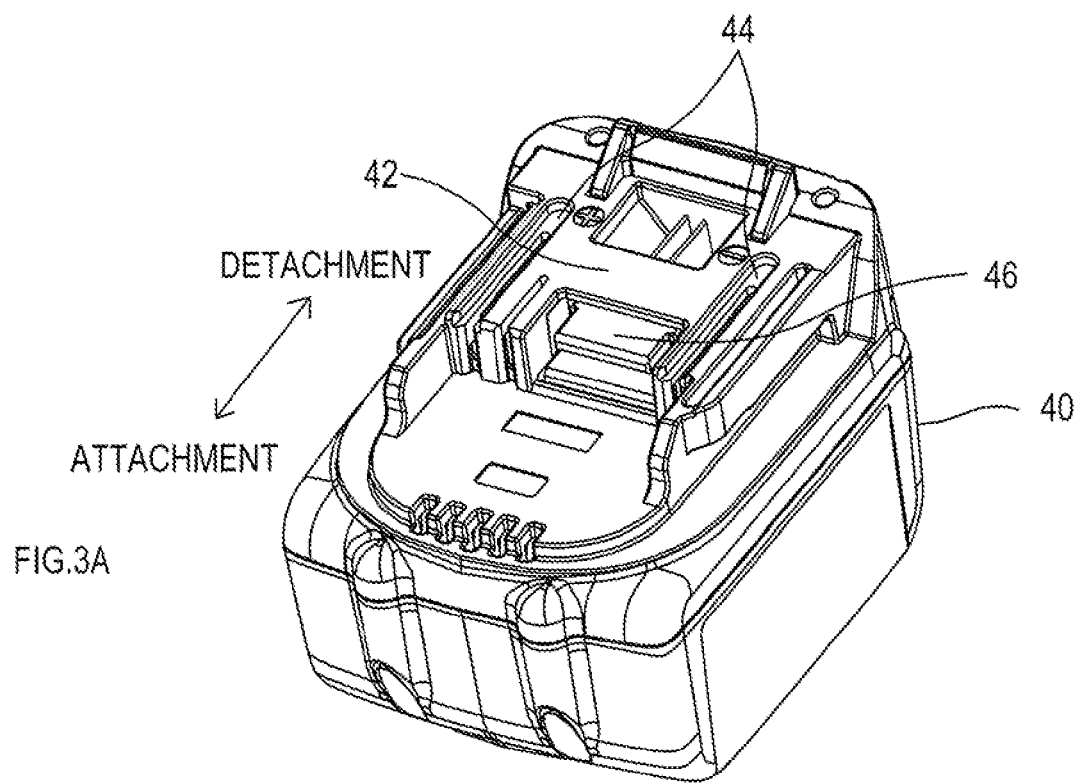
FIGS. 3A and 3B are perspective views showing an outer appearance of the battery pack and a charger.
Figure 3B:
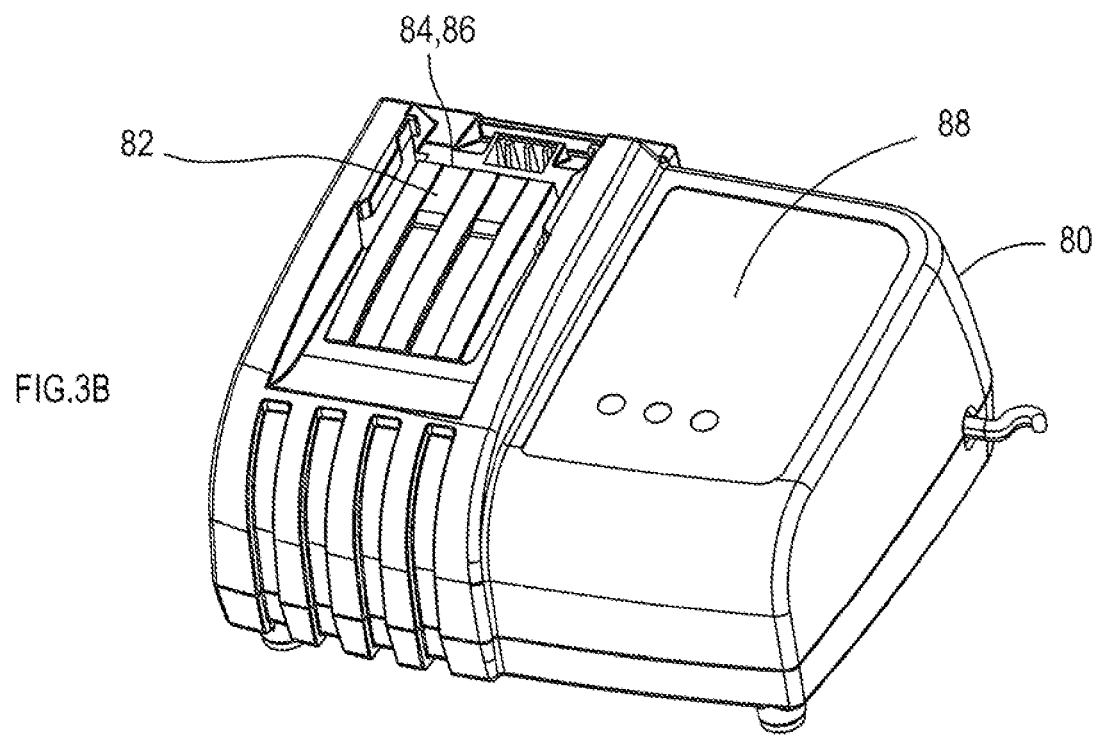

Particularly, as shown in FIG. 3A, on top of the battery pack 40, a connector portion 42 is formed which is used for connecting to the attachment portion 24 of the body 12 and the charger 80 shown in FIG. 3B. In addition, in the connector portion 42, a power supply terminal portion 44 (hereinafter referred to as a terminal portion 44), and a connecting terminal portion 46 (hereinafter referred to as a terminal portion 46) for connecting to a battery or a control circuit inside the battery pack 40 are provided.

The battery pack 40 is electrically connected to the internal circuits of the body 12 through the terminal portions 44 and 46 by being attached to the attachment portion 24 of the body 12 through the connector portion 42. Thereby, the battery pack 40 is able to supply direct current power to the body 12, and transmit and receive various signals (see FIG. 4).

In addition, as shown in FIG. 3B, a battery pack attachment portion 82 (hereinafter referred to as an attachment portion 82) and a display portion 88 are formed on top of the charger 80. The display portion 88 is provided with a plurality of display lamps for indicating that, for example, charging to the battery pack 40 is being conducted.

The attachment portion 82 of the charger 80 is configured such that the battery pack 40 can be attached by fitting a distal end portion of the connector portion 42 of the battery pack 40 to the attachment portion 82 and by sliding the connector portion 42 in an attaching direction, in a state where the connector portion 42 faces downward.

The attachment portion 82 includes a power supply terminal portion 84 (hereinafter referred to as a terminal portion 84) and a connection terminal portion 86 (hereinafter referred to as a terminal portion 86). The terminal portions 84 and 86 are electrically connected to the terminal portions 44 and 46 of the battery pack 40 upon attachment of the battery pack 40. Due to connection between each of the terminal portions, charging to the battery pack 40 from the charger 80 becomes possible (see FIG. 5).

The attachment portion 24 of body 12, similar to the charger 80, is configured to be able to fit to the connector portion 42 of the battery pack 40.
(Circuit Configuration of Body 12)

Figure 4:
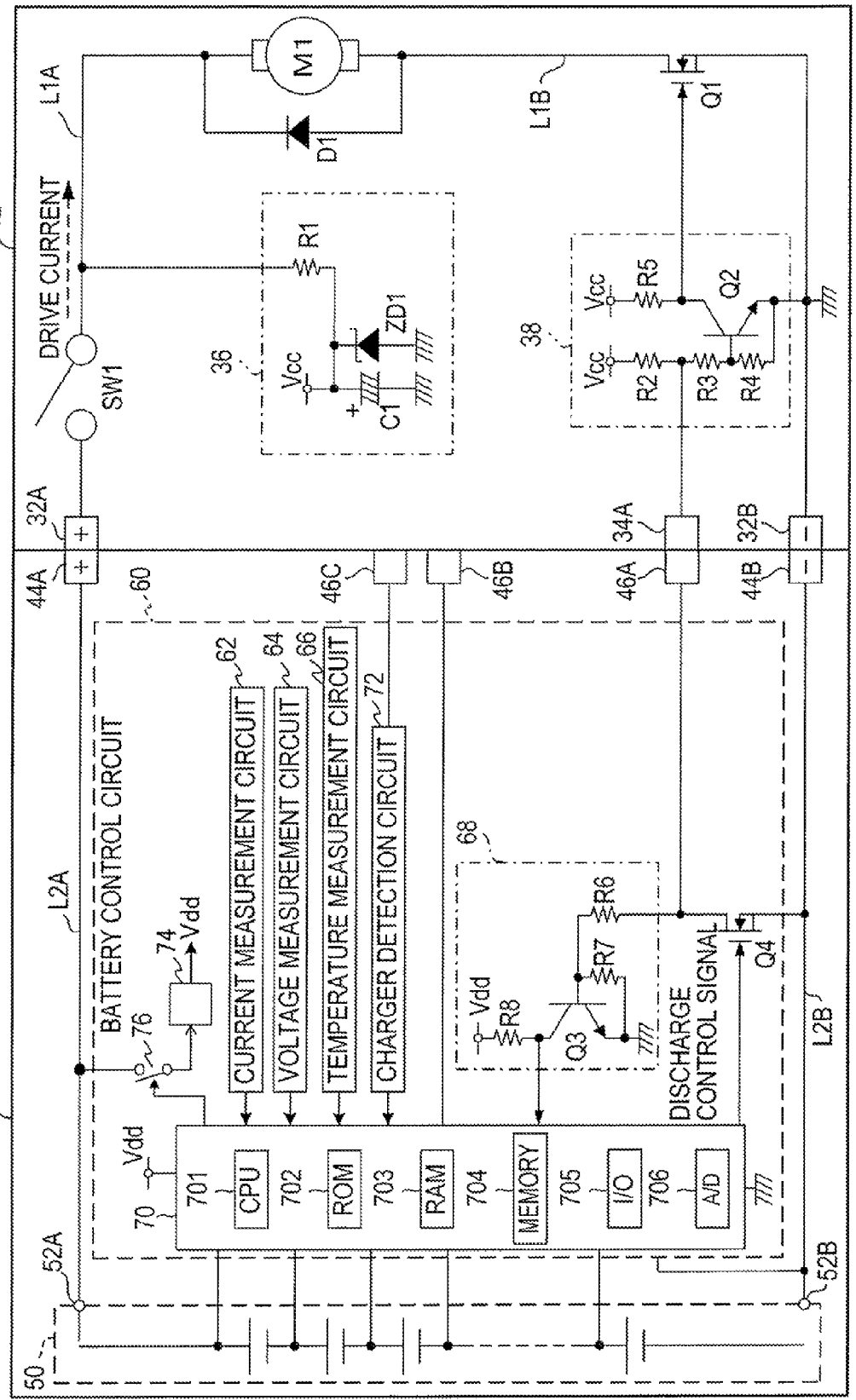
FIG. 4 is a circuit diagram showing an electronic circuit formed by the power tool body and the battery pack when the battery pack is attached to the power tool body.

As shown in FIG. 4, the body 12 is provided with a positive electrode side terminal 32A (hereinafter referred to as a terminal 32A) and a negative electrode side terminal 32B (hereinafter referred to as a terminal 32B), as terminals for connecting to the terminal portion 44 of the battery pack 40. The body 12 is also provided with a signal terminal 34A (hereinafter referred to as a terminal 34A) for connecting to the terminal portion 46 of the battery pack 40.

The terminal 32A is connected to one end of the motor M1 via a main switch SW1 (hereinafter referred to as a switch SW1) and a positive electrode side power supply line L1A (hereinafter referred to as a line L1A). The terminal 32B is connected to the other end of the motor M1 via a transistor Q1 for controlling conduction to the motor M1 and a negative electrode side power line L1B (hereinafter referred to as a line L1B).

In the present embodiment, the motor M1 is configured as a brushed direct current motor. When the switch SW1 is in on-state, the transistor Q1 is turned on by an input signal from the battery pack 40. Thereby, the motor M1 is energized to rotate.

In addition, a diode (so-called flyback diode) D1, which suppresses a back electromotive force generated in the line L1B upon turn-off of the transistor Q1 to protect the transistor Q1, is connected to the motor M1.

The switch SW1 is switched on and off in conjunction with the above described switch 22. When the switch 22 is pulled, the switch SW1 is turned on. When the switch 22 is released, the switch SW1 is turned off.

In addition, in this embodiment, an N-channel MOSFET is used for the transistor Q1.

Next, the body 12 is provided with a power supply circuit 36 for control (hereinafter referred to as a power supply circuit 36) which generates a power supply voltage for driving internal circuits, and an input and output circuit 38 which is used to input and output signals to and from the battery pack 40.

The power supply circuit 36 includes a zener diode ZD1 (hereinafter referred to as a diode ZD1) and a capacitor C1. A cathode of the diode ZD1 is connected to the line L1A through a resistor R1. An anode of the diode ZD1 is connected to a ground of the body 12.

In the present embodiment, the capacitor C1 is an electrolytic capacitor. A positive electrode side of the capacitor C1, together with the cathode of the diode ZD1, is connected to the line L1A via the resistor R1. A negative electrode side of the capacitor C1 is connected to the ground of the body 12.

In addition, the terminal 32B is connected to the ground of the body 12. When the battery pack 40 is attached to the body 12, a negative electrode side power line L2B (hereinafter referred to as a line L2) of the battery pack 40, and further a negative electrode side terminal 52B (hereinafter referred to as a terminal 52B) of a battery 50, are connected to the ground of the body 12 via the terminal 32B.

Also, when the switch SW1 is in on-state, a positive electrode side power line L2A (hereinafter referred to as a line L2A) of the battery pack 40, and further a positive electrode side terminal 52A (hereinafter referred to as a terminal 52A) of the battery 50, are connected to the line L1A via the terminal 32A.

Therefore, in the power supply circuit 36, when the switch SW1 is turned on, battery voltage (direct current 36 V, for example) is applied to the anode of the diode ZD1 via the resistor R1 from the line L1A. The battery voltage is then stepped down to a prescribed constant voltage (direct current 5 V, for example) by the diode ZD1.

The capacitor C1 is charged by the stepped down direct current voltage. The voltage between both ends of the capacitor C1 is supplied to the various internal circuits of the body 12 as a power supply voltage Vcc for operation of the internal circuits.

Next, the input and output circuit 38 includes a transistor Q2 and resistors R2, R3, R4 and R5.

The transistor Q2, in this embodiment, is a NPN bipolar transistor. A base of the transistor Q2 is connected to the terminal 34A via the resistor R3 and is connected to the ground via the resistor R4.

In addition, the power supply voltage Vcc is applied to the terminal 34A via the resistor R2. The power supply voltage Vcc is also applied to a collector of the transistor Q2 via the resistor R5. The collector of the transistor Q2 is also connected to a gate of the transistor Q1. An emitter of the transistor Q2 is connected to the ground.

Resistance values of the resistors R2, R3 and R4 are set such that the transistor Q2 is turned on when the power supply voltage Vcc has reached a predetermined voltage since the switch SW1 is turned on, and an electrical potential of the terminal 34A becomes high level in the vicinity of the power supply voltage Vcc.

Then, when the transistor Q2 is in on-state, the gate of the transistor Q1 is connected to the ground via the transistor Q2. Thus, the transistor Q1 is in off-state and interrupts a conduction path to the motor M1.

In addition, when the terminal 34A is connected to the ground due to operation of a battery control circuit 60 inside the battery pack 40 (turn-on of a transistor Q4 which will be described later in detail), the transistor Q2 is in off-state. In this state, since the power supply voltage Vcc is applied to the gate of the transistor Q1 via the resistor R5, the transistor Q1 is turned on, and forms the conduction path to the motor M1.

In the present embodiment, the collector of the transistor Q2 is connected directly to the gate of the transistor Q1. The collector of the transistor Q2 may be connected to the gate of the transistor Q1 via a drive circuit for switching the transistor Q1.

(Circuit Configuration of Battery Pack 40)

On the other hand, the battery pack 40 is provided with: a positive electrode side terminal 44A (hereinafter referred to as a terminal 44A) and a negative electrode side terminal 44B (hereinafter referred to as a terminal 44B) provided in the terminal portion 44; three signal terminals 46A, 46B and 46C (hereinafter referred to as terminals 46A, 46B and 46C) provided in the terminal portion 46; the battery 50; and the battery control circuit 60.

The terminal 52A of the battery 50 is connected to the terminal 44A via the line L2A. The terminal 52B of the battery 50 is connected to the terminal 44B via the line L2B.

When the battery pack 40 is attached to the body 12, the terminal 44A is connected to the terminal 32A of the body 12, the terminal 44B is connected to the terminal 32B of the body 12, and the terminal 46A is connected to the terminal 34A of the body 12.

The terminals 46B and 46C are used for connecting to the terminal portion 86 of the charger 80, when the battery pack 40 is attached to the charger 80. The terminals 46B and 46C are in opened-state when the battery pack 40 is attached to the body 12.

The battery 50 is constructed by a plurality (10, for example) of battery cells connected in series between the terminals 52A and 52B. The battery 50 generates a drive voltage (for example, direct current 36 V) for driving the motor M1.

The battery cell is, for example, a lithium-ion rechargeable battery which generates a direct current voltage of 3.6 V alone. For this reason, the battery 50 can produce a high output. For example, a discharge current which can be outputted is equal to or larger than 10 A.

The battery control circuit 60 has a current measurement circuit 62, a voltage measurement circuit 64, a temperature measurement circuit 66, a switch operation detection circuit 68, a charger detection circuit 72, a main control unit (MCU) 70, a transistor Q4, a power supply circuit 74 for control (hereinafter referred to as a power supply circuit 74), and a shutdown switch 76 (hereinafter referred to as a switch 76).

Here, the current measurement circuit 62 is for measuring a current flowing through the line L2A or line L2B, and outputs a current measurement signal having a voltage value corresponding to a magnitude of the current to the MCU 70.

The voltage measurement circuit 64 sequentially measures a voltage of each of the battery cells that configure the battery 50, and outputs a voltage measurement signal having a voltage value corresponding to a magnitude of the measured voltage to the MCU 70.

The temperature measurement circuit 66 includes a thermistor (not shown) disposed around the battery 50. The temperature measurement circuit 66 measures a battery temperature via the thermistor, and outputs a temperature measurement signal having a voltage value corresponding to the measured temperature to the MCU 70.

Next, the switch operation detection circuit 68 is for detecting that the switch 22 of the body 12 is operated. The switch operation detection circuit 68 is provided with a transistor Q3, and resistors R6, R7 and R8.

The transistor Q3, in the present embodiment, is a NPN bipolar transistor. A base of the transistor Q3 is connected to the terminal 46A via the resistor R6, and is connected to a ground of the battery pack 40 via the resistor R7. An emitter of the transistor Q3 is connected to the ground.

In addition, the ground of the battery pack 40 is connected to the line L2B. This means that when the battery pack 40 is attached to the body 12, the grounds of the battery pack 40 and the body 12 have the same electric potential, and each of these grounds has the same electric potential as that of the negative electrode of the battery 50.

The collector of the transistor Q3 is connected to the MCU 70, and is also connected to an output path of a power supply voltage Vdd (for example, direct current 5 V) from the power supply circuit 74 provided in the battery pack 40 via the resistor R8.

The power supply circuit 74 receives power supply from the battery 50 to generate the constant power supply voltage Vdd, and supplies electric power to various types of electronic circuits, including the battery control circuit 60, inside the battery pack 40. The power supply circuit 74, for example, is constituted by a switching power supply circuit or the like.

Power supply from the battery 50 to the power supply circuit 74 is carried out via a switch 76. The switch 76 is normally on. The switch 76 is turned off when an overdischarged state where the voltage of the battery 50 is lower than a predetermined level is present.

Particularly, in the battery control circuit 60, the MCU 70 monitors the voltage of each battery cell constituting the battery 50 and the voltage of the overall battery 50, based on the voltage measurement signal from the voltage measurement circuit 64. If there is at least one battery cell of which voltage become equal to or smaller than a predetermined cell voltage threshold, or if the voltage of the battery 50 becomes equal to or smaller than a predetermined battery voltage threshold, the MCU 70 determines that the overdischarged state is present and turns off the switch 76.

When the switch 76 is turned off, electric power from the battery 50 is no longer supplied to the power supply circuit 74. Thereby, the output of the control voltage Vdd from the power supply circuit is stopped, and further, operation of the battery control circuit 60 is stopped.

Monitoring of the voltage of the battery 50 by the MCU 70 is carried out continuously as long as the MCU 70 operates. Particularly, for the MCU 70 of the present embodiment, a normal operation mode and a sleep mode in which the function and power consumption are suppressed are provided as operation modes, as later described. In either mode, voltage monitoring of the battery 50 is carried out. As described above, if it is determined that the overdischarged state is present, the switch 76 is turned off, so as to suppress further degradation in capacity of the battery 50.

On the other hand, the transistor Q4 is an N-channel MOSFET in the present embodiment. A drain of the transistor Q4 is connected to the terminal 46A to which the base of the transistor Q3 is connected via the resistor R6. Further, a source of the transistor Q4 is connected to the ground. A gate of the transistor Q4 is connected to the MCU 70.

Therefore, the transistor Q4 is turned on and off by an output signal (a later described discharge control signal) from the MCU 70. When the transistor Q4 is off, the terminal 46A is in opened-state.

Accordingly, if the transistor Q4 is off when the battery pack 40 is attached to the body 12 and the switch 22 is operated (switch SW1: ON), a high level signal corresponding to the power supply voltage Vcc inside the battery pack 40 is inputted to the terminal 46A of the battery pack 40 from the terminal 34A of the body 12. The transistor Q3 inside the switch operation detection circuit 68 is turned on. An input signal to the MCU 70 from the switch operation detection circuit 68 becomes low level.

Also, if the switch 22 is not operated (switch SW1: OFF) even if the battery pack 40 is attached to the body 12, the terminal 34A of the body 12 becomes low level (ground potential). Thus, the transistor Q3 in the switch operation detection circuit 68 is turned off. An input signal to the MCU 70 from the switch operation detection circuit 68 becomes high level.

Next, the charger detection circuit 72, when the battery pack 40 is attached to the charger 80, and a high level signal (direct current 5 V, for example) is inputted to the terminal 46C from the charger 80, enters a detection signal indicating to that effect. The charger detection circuit 72 is configured similarly to the switch operation detection circuit 68.

Particularly, the charger detection circuit 72, when the terminal 46C is in opened-state, inputs to the MCU 70 a high level signal corresponding to the power supply voltage Vdd via a pull-up resistor. When a high level signal is inputted to the terminal 46C from the charger 80, a transistor connected to a signal path to the MCU 70 is turned on, connects the signal path to the ground, and sets the output to the MCU 70 to low level.

For this reason, on the side of the MCU 70, it is possible to detect that the switch 22 is operated on the side of the body 12 to which the battery pack 40 is attached, based on the input signal from the switch operation detection circuit 68. Also it is possible to detect that the battery pack 40 is attached to the charger 80 based on the input signal from the charger detection circuit 72.

In addition, the MCU 70 is configured as a known microcomputer including a CPU 701, a ROM 702, a RAM 703, a rewritable nonvolatile memory 704, an input/output (I/O) port 705, an A/D converter 706, etc., and operates in accordance with various programs stored in the ROM 702. The MCU 70 realizes various functions such as controlling charge and discharge of the battery, monitoring the state of the battery, and so on. Detail of the operation will be described later.

(Circuit Configuration of Charger 80)

Figure 5:
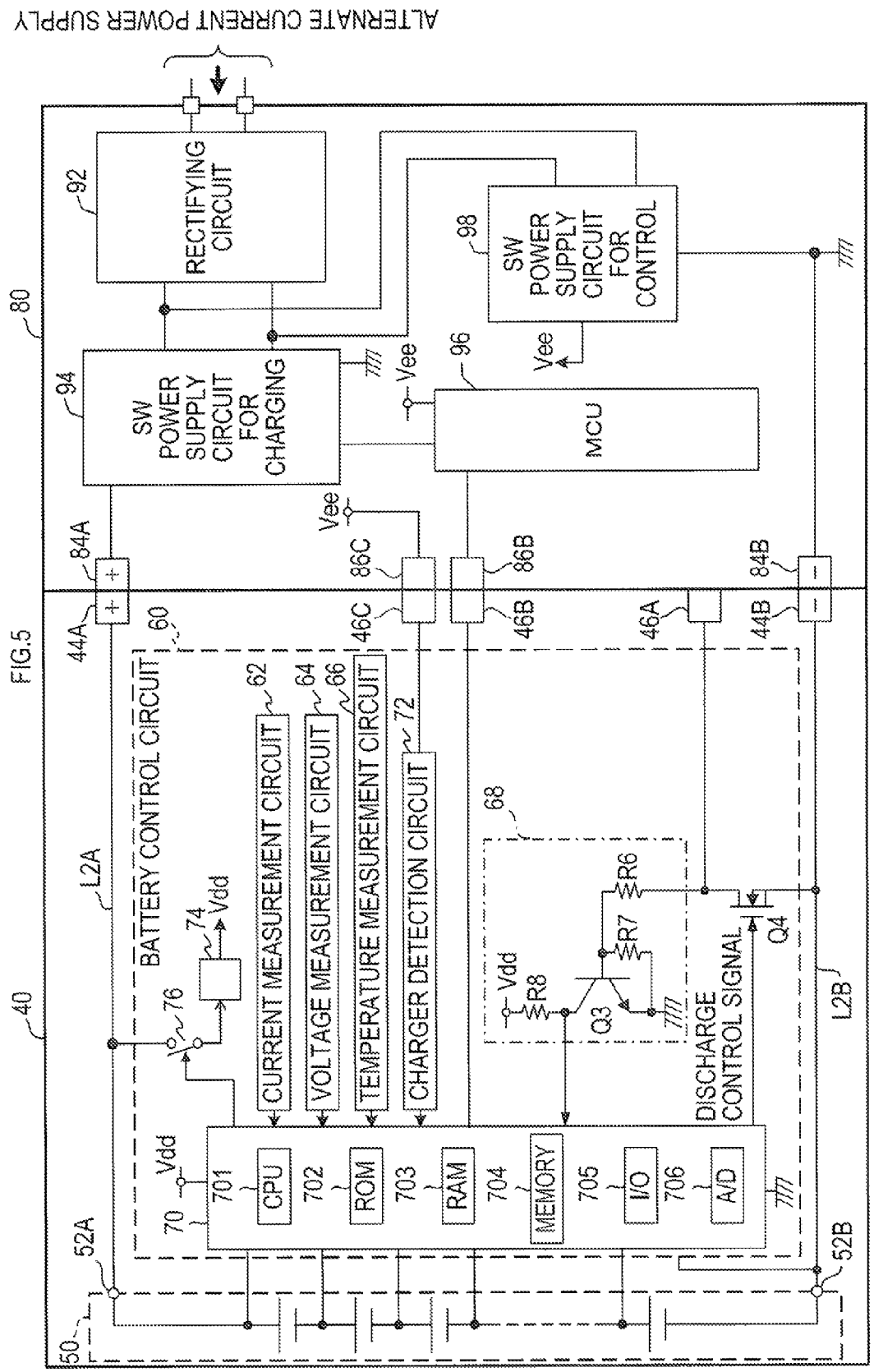
FIG. 5 is a circuit diagram showing an electronic circuit formed by the battery pack and the charger when the battery pack is attached to the charger.

As shown in FIG. 5, the charger 80 is provided with a positive electrode side terminal 84A (hereinafter referred to as a terminal 84A) and a negative electrode side terminal 84B (hereinafter, referred to as a terminal 84B) as terminal portions 84 for connecting to the terminals 44A and 44B of the battery pack 40, and signal terminals 86B and 86C (hereinafter referred to as terminals 86B and 86C) as terminal portions 86 for connecting to the terminals 46B and 46C of the battery pack 40.

In addition, the charger 80 is provided with a rectifier circuit 92, a switching power supply circuit 94 for charging (hereinafter referred to as a power supply circuit 94), a main control unit (MCU) 96, and a switching power supply circuit 98 for control (hereinafter referred to as a power supply circuit 98).

The rectifier circuit 92 rectifies an alternate current voltage supplied from an alternate current power supply such as a commercial power supply. The rectified output is outputted to the power supply circuit 94 and the power supply circuit 98.

The power supply circuit 94 is a switching circuit which charges the battery 50 based on the output from the rectifier circuit 92. The power supply circuit 94 is drive controlled by the MCU 96.

The MCU 96, as well as the MCU 70 in the battery pack 40, is configured as a microcomputer. The MCU 96 takes in a variety of information indicating the state of the battery via the terminals 46B and 86B from the MCU 70 inside the battery control circuit 60 to drive control the power supply circuit 94. Thereby, The MCU 96 controls charging patterns (charging current, charging voltage, etc.) to the battery 50.

The power supply circuit 98 generates a power supply voltage Vee (direct current 5 V, for example) to operate internal circuits of the MCU 96, etc.

The ground of the charger 80 is connected to the terminal 52B of the battery 50 via the terminal 84B and the terminal 44B of the battery pack 40. The charging voltage generated at the power supply circuit 94 is applied to the terminal 52A of the battery 50 via the terminal 84A and the terminal 44A of the battery pack 40.

Also, to the terminal 86C of the charger 80, the power supply voltage Vee generated at the power supply circuit 98 is applied.

For this reason, when the battery pack 40 is attached to the charger 80, and the power supply voltage Vee is generated at the power supply circuit 98, a high level signal corresponding to the power supply voltage Vee (which is an example of a charger signal of the present invention) is inputted to the charger detection circuit 72 via the terminals 86C and 46C on the battery pack 40 side. Then, the signal level of the detection signal inputted to the MCU 70 from the charger detection circuit 72 changes from high level to low level.

The charger 80 is provided with a display portion 88 including a plurality of indicator lamps. The indicator lamps of the display portion 88 are lighted by the MCU 96 in accordance with a charging state to the battery 50.

(Operation of MCU 70 Inside Battery Pack 40)

Next, operation of the MCU 70 inside the battery pack 40 will be described.

The MCU 70 has operating modes of a normal operation mode and a sleep mode. The MCU 70 operates in the normal operation mode when the MCU 70 is in a condition to be normally operated, such as when the battery pack 40 is connected to the body 12 and the body 12 is being used, or when the battery pack 40 is connected to the charger 80 and charging is being made to the battery 50.

On the other hand, when the prescribed sleep-mode transition condition (the detail will be later described) is satisfied, that is, for example, when the charger 80 is not connected to the battery pack 40 or the switch SW1 of the body 12 is turned off, the MCU 70 operates in the sleep mode (i.e., low power consumption mode) in which its function and power consumption are limited.

The MCU 70, in the sleep mode, at least continues to monitor the detection signal from the switch operation detection circuit 68 or the charger detection circuit 72 to change from high to low level. The MCU 70 also continues to watch the voltage of the battery 50, and turns off the switch 76 when the overdischarged state is present, as mentioned above. The MCU 70 achieves low power consumption by basically stopping operation other than those mentioned above.

Maintaining the functions described above in the sleep mode is only an example. Which function to maintain and which function to stop in the sleep mode can be determined as required.

During the operation in the sleep mode, when the detection signal from the switch operation detection circuit 68 or the charger detection circuit 72 changes to low level from high level, the MCU 70 is started up, and makes transition to the normal operation mode in which charge-discharge control of the battery 50 and monitoring and protection operation are carried out.

When the MCU 70 is in the sleep mode, the discharge control signal outputted to the gate of the transistor Q4 from the MCU 70 is low level. The transistor Q4 is held in an off state.

The MCU 70, when started up by the detection signal (low level) from the switch operation detection circuit 68, sets the discharge control signal to high level to turn on the transistor Q4, and permits discharge to the motor M1 from the battery 50.

Particularly, when the transistor Q4 is turned on, the transistor Q2 in the input/output circuit 38 of the body 12 is turned off and so the transistor Q1 provided in the conduction path to the motor M1 is turned on. Thereby, electric current flows to the motor M1 and rotates the motor M1.

Also, when the discharge control signal is set to high level and discharge to the motor M1 from the battery 50 is permitted (that is, at the time of discharge from the battery 50) as above, the MCU 70 executes a variety of protection processes to monitor the battery 50 and protect the battery 50 from the overdischarge, etc.

In the present embodiment, as the variety of protection processes, a discharge current limitation process, an overdischarge limitation process, and a battery temperature limitation process are executed in which discharge to the motor M1 from the battery 50 is limited based on results of the measurements by the current measurement circuit 62, the voltage measurement circuit 64, and the temperature measurement circuit 66.

Here, in the discharge current limitation process, whether or not overcurrent is flowing, and, if overcurrent is flowing, the overcurrent of what level is, are measured periodically and cumulatively based on the discharge current measured at the current measurement circuit 62 at the time of discharge. Depending on the results of the measurements, various limitations are imposed such as to permit or stop the discharge, etc. Details about the discharge current limitation process will be described later.

In the overdischarge limitation process, if there is at least one battery cell of which voltage has become equal to or lower than a predetermined cell voltage threshold, or when the voltage of the battery 50 has become equal to or lower than a predetermined battery voltage threshold, based on the battery voltage measured at the voltage measurement circuit 64 at the time of discharge, it is determined that the battery 50 is in an overdischarged state and the discharge control signal is set to low level to stop the discharge to the motor M1 from the battery 50. In the overdischarge limitation process, if it is determined that the battery 50 is in the overdischarged state, the switch 76 is also turned off as described above.

In addition, in the battery temperature limitation process, when the battery temperature measured at the temperature measurement circuit 66 at the time of discharge exceeds a predetermined threshold, it is determined that the battery 50 is in an overheated state. The discharge control signal is set to low level to stop the discharge from the battery 50 to the motor M1.

In either of the above-mentioned limitation processes, when the discharge control signal is set to low level, and the discharge from the battery 50 to the motor M1 is stopped, a user detects an abnormality and releases the switch 22. Then, the switch SW1 is turned off, and the power supply voltage Vcc outputted from the power supply circuit 36 decreases on the side of the body 12. The input signal to the terminal 46A from the terminal 34A becomes low level.

For this reason, the MCU 70, when stopping the discharge to the motor M1 from the battery 50 by the above described limitation processes, determines whether or not the detection signal from the switch operation detection circuit 68 has become high level, thereby to recognize that the switch SW1 has been turned off.

The MCU 70, when recognizing that the switch SW1 has been turned off, waits for the switch SW1 to be turned on until a predetermined time elapses. When the switch SW1 is turned on before the predetermined time elapses, the MCU 70 again sets the discharge control signal to high level to permit discharge (i.e., driving of the motor M1). If the switch SW1 is not turned off before the predetermined time elapses, the MCU 70 makes transition to the sleep mode.

The MCU 70, if it does not determine an abnormality such as overcurrent by the above described limitation processes, continues the output of the discharge control signal (high level), and thus cannot detect an off state of the switch SW1 (i.e., stop of operation of the switch 22) via the switch operation detection circuit 68.

Therefore, in the present embodiment, while the discharge control signal is high level, the MCU 70 sets the discharge control signal to low level for a very short time periodically. The MCU 70 checks the detection signal from the switch operation detection circuit 68 when the discharge control signal is set to low level, in order to determine the operation state of the switch SW1.

The above-mentioned method of determining the operation state of the switch SW1 is only one example. For example, a separate terminal for outputting a signal indicating the operation state of the switch SW1 may be provided in the body 12, and a separate terminal for inputting the signal may be provided in the battery pack 40. The operation state of the switch SW1 may be determined based on the inputted signal. Also, for example, when the MCU 70 is outputting the discharge control signal (high level), a suspension period of conduction to the motor M1 may be measured based on the measurement signal, etc. from the current measurement circuit 62. When the suspension period of conduction reaches a predetermined period of time, it may be determined that the switch SW1 has been turned off. In other words, as long as the MCU 70 of the battery pack 40 can determine the operation state of the switch SW1, there is no specific limitation in the particular determination method.

In addition, the MCU 70, when started up by the detection signal (low level) from the charger detection circuit 72, outputs a variety of information indicating the state of the battery 50 (battery voltage, battery capacity, etc.) to the MCU 96 of the charger 80 via the terminals 46B and 86B. Then, when charging to the battery 50 from the charger 80 is started, the MCU 70 executes a charging control process for battery protection.

When the switch 76 is turned off, the MCU 70 is no longer supplied with the power supply voltage Vdd and stops its operation. However, when the charger 80 is connected, the power supply voltage Vee in the charger 80 is supplied into the battery pack 40. Based on the power supply voltage Vee, the power supply voltage Vdd of the MCU 70 is generated and the MCU 70 starts operating again. The MCU 70, when starting its operation by supply of the power supply voltage Vdd, turns on the switch 76 again.

The charging control process executed by the MCU 70 of the battery pack 40 is carried out in the following procedure. The determination whether or not an abnormablity has occurred, such as overcharge to the battery 50 and overheating of the battery 50, is made based on the result of the measurement by each of the above measurement circuits 62, 64 and 66. When an abnormality is found, a command signal to stop charging or reduce the charging current is sent to the charger 80 via the terminals 46B and 86B.

In addition, the charging control process continues until the detection signal from the charger detection circuit 72 becomes high level (i.e., until the power supply voltage Vee from the charger 80 is no longer inputted). When the detection signal becomes high level, the MCU 70 determines that the battery pack 40 has been removed from the charger 80.

(Sleep-Mode Transition Condition)

In the present embodiment, when the battery pack 40 is not in use, the battery control circuit 60 (more specifically, the MCU 70) is operated in the sleep mode in which low power consumption is achieved and its function is suppressed, to conserve power in the battery pack 40. The enabled function in the sleep mode is, as described above, to monitor at least whether or not the switch SW1 of the body 12 has been turned on (i.e., whether or not discharge to the body 12 from the battery 50 has been initiated), whether or not the charger 80 is connected, and whether or not the battery 50 is in the over-discharged state.

Functions other than the above may be also enabled even in the sleep mode, as considered appropriate. Particularly, which function to enable in the sleep mode can be determined as required. Also, for example, a timer may be provided inside or outside the MCU 70. In the sleep mode, at least the timer is operated and each of the above monitoring function may be stopped. The normal operation mode may be temporarily resumed at a predetermined time interval, and a variety of monitoring may be performed in the battery pack 40. More particularly, for example, the MCU 70 may resume the normal operation mode for only a second after the sleep mode is continued for 59 seconds to perform a predetermined operation such as various monitoring, etc. Thereafter, the MCU 70 may make transition to the sleep mode again.

In the present embodiment, conditions for transition to the sleep mode include five conditions (a) to (e) below:

(a) a charger unconnected state is present, which is a state wherein the battery pack 40 is not connected to the charger 80;

(b) a non-discharging state is present, which is a state wherein the discharge current is not flowing to the body 12 from the battery 50;

(c) a charging unexecuted state is present, which is a state wherein a charging current for charging the battery 50 is not flowing;

(d) an operation switch-off state is present, which is a state wherein the switch 22 of the body 12 is turned off (i.e., the switch SW1 is turned off); and (e) an overloaded state is not present, which is a state wherein, when the switch 22 of the body 12 is turned on (i.e., when the switch SW1 is turned on), there is a risk that an overcurrent which is equal to or larger than the predetermined current threshold may flow to the body 12 from the battery 50.

Among the above-mentioned conditions, whether or not the condition (a) is satisfied, i.e., whether or not the charger unconnected state is present, is determined based on the detection signal from the charger detection circuit 72.

Whether or not the condition (b) is satisfied, i.e., whether or not the non-discharging state is present, is determined based on the measurement signal from the current measurement circuit 62. Likewise, whether or not the condition (c) is satisfied, i.e., whether or not the charging unexecuted state is present, is determined based on the measurement signal from the current measurement circuit 62.

Also, whether or not the condition (d) is satisfied, i.e. whether or not the operation switch-off state is present, is determined based on the detection signal from the switch operation detection circuit 68.

Whether or not the condition (e) is satisfied, i.e., whether or not the overload state is present, is determined based on a later described overcurrent counter value K (hereinafter, referred to as a counter value K). Specifically, if this counter value K is zero (0), it is determined that the overloaded state is not present.

Figure 6:
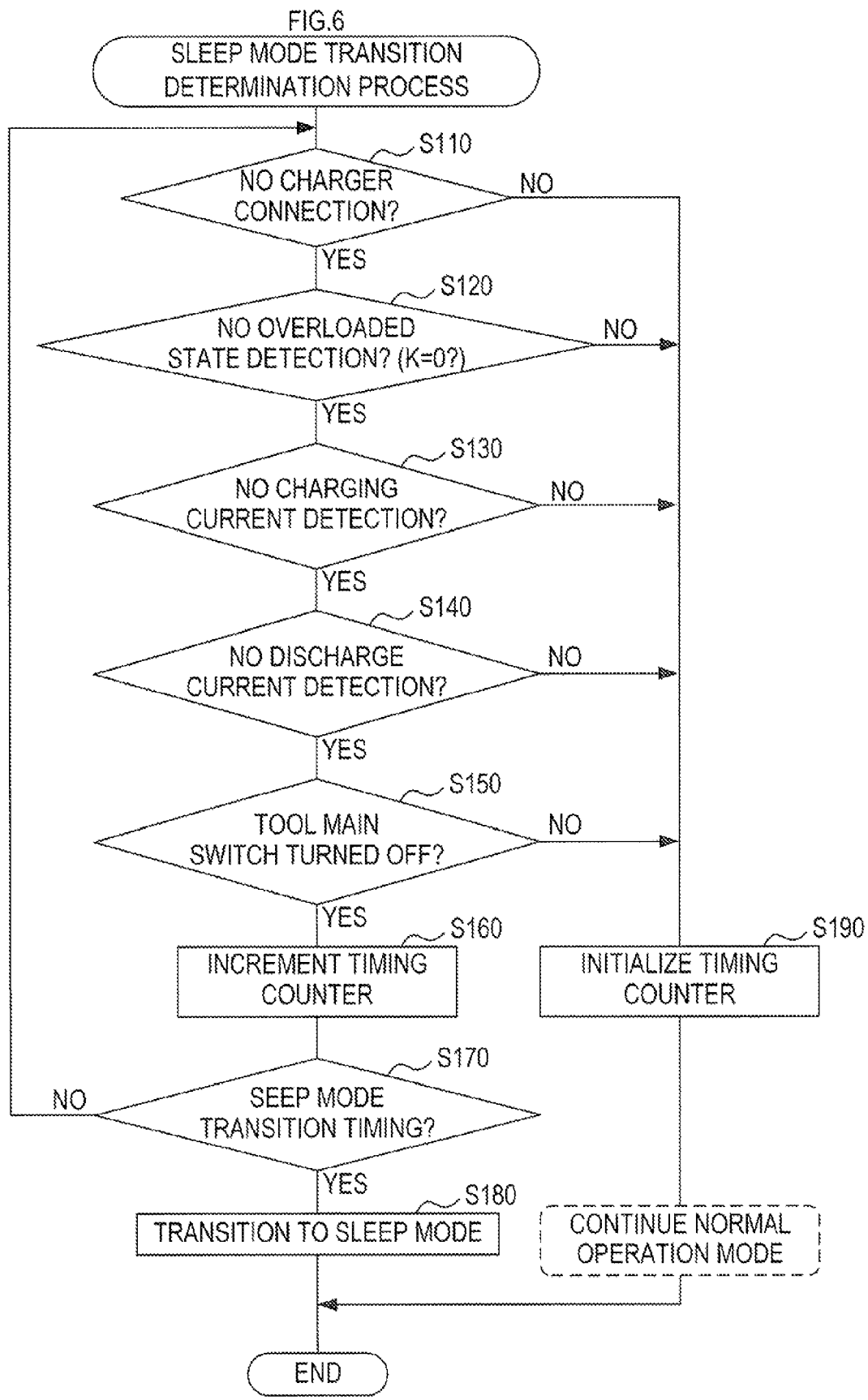
FIG. 6 is a flowchart showing a sleep-mode transition determination process executed in a MCU of the battery pack.

The MCU 70 executes a sleep-mode transition determination process shown in FIG. 6. When all of the above conditions (a) to (e) are satisfied, and when an all conditions satisfaction state which is a state wherein all the conditions are satisfied has continued for a predetermined period of time, the MCU 70 shifts to the sleep mode.

Hereinafter, the sleep-mode transition determination process will be described.

(Sleep-Mode Transition Determination Process)

The sleep-mode transition determination process shown in FIG. 6 is the process repeatedly executed at a constant cycle when the MCU 70 is operating in the normal operation mode. The MCU 70, when this process is started, determines first in S110 whether or not there is no connection to the charger 80, i.e., whether or not the charger unconnected state which is the condition (a) above is present. When the charger 80 is connected to the battery pack 40, it is determined that the condition (a) is not satisfied. The process proceeds to S190.

In S190, a sleep-mode transition timing counter (hereinafter, referred to as a timing counter) is initialized. The timing counter is a counter for counting the duration of the all-condition satisfaction state which is a state wherein all the above conditions (a) to (e) are satisfied. After the timing counter is initialized in S190, operation in the normal operation mode continues as is.

On the other hand, if it is determined that the charger unconnected state is present, at least the condition (a) is assumed satisfied. The process proceeds to S120.

In S120, it is determined whether or not the overloaded state is detected, i.e., whether or not the above condition (e) is satisfied. More particularly, it is determined whether or not the counter value K is zero (0) (an example of an overload determination threshold of the present invention). If the counter value K is not zero (0), it is determined that the overloaded state is present. The process proceeds to S190. If K=0, it is determined that the overloaded state is not present, i.e., the condition (e) is also satisfied. The process proceeds to S130.

In S130, it is determined whether or not the charging current is detected, i.e., whether or not the charging unexecuted state is present which is the state of the above condition (c). Then, if the charging current is flowing to the battery 50, the process proceeds to S190, assuming that the condition (c) is not satisfied. If it is determined that the charging unexecuted state is present, which is the state wherein the charging current is not flowing, the process proceeds to S140, assuming that the condition (c) is also satisfied.

In S140, it is determined whether or not the discharge current is detected, i.e., whether or not the non-discharging state is present which is the state of the above condition (b). If the discharge current is flowing to the body 12 from the battery 50, the process proceeds to S190, assuming that the condition (b) is not satisfied. If it is determined that the non-discharging state is present, which is the state wherein the discharge current is not flowing, the process proceeds to S150, assuming that the condition (b) is also satisfied.

In S150, it is determined whether or not the switch SW1 of the body 12 is off, i.e., whether or not the operation switch-off state is present, which is the state of the above condition (d). If the switch SW1 is on (i.e., the switch 22 is turned on), the process proceeds to S190, assuming that the condition (d) is not satisfied. If it is determined that the operation switch-off state is present, which is the state wherein the switch SW1 is off, (i.e., the switch 22 is off), the process proceeds to S160, assuming that the condition (d) is also satisfied.

In other words, an advance to S160 means that the all-condition satisfaction state is present, which is the state wherein all the above five conditions (a) to (e) are satisfied. Therefore, in order to count the duration of the all-condition satisfaction state, the timing counter is incremented in S160.

Then, it is determined in S170 whether or not steep-mode transition timing is reached. Particularly, the determination is made based on whether or not the value of the timing counter has reached a predetermined value, i.e., whether or not the all-condition satisfaction state has continued for a predetermined period of time.

Until the value of the timing counter reaches the predetermined value, the process returns to S110 again, and repeats each of the subsequent determination processes. If, during this time, any one of the above five conditions (a) to (e) is no longer satisfied, i.e., if any one of the determination processes of S110 to S150 is negatively determined, the value of the timing counter is initialized in S190.

On the other hand, if the timing counter is kept incremented, while the all-condition satisfaction state is maintained, and reaches the predetermined value, it is determined that the sleep-mode transition timing has been reached (i.e., the all-condition satisfaction state has continued for the predetermined time). The process proceeds to S180 to shift the operating mode to the sleep mode.

(Discharge Current Limitation Process)

Next, the discharge current limitation process which includes arithmetic processing of the counter value K used in the determination process of S120 will be described with reference to FIG. 7.

This discharge current limitation process is a process to be repeatedly executed in the MCU 70 at a constant cycle (for example, every 0.5 seconds). When this process is started, it is first determined in S210 whether the battery 50 is currently being discharged or charged.

If the battery 50 is currently being discharged, a measured value I of the discharge current and a measured value T of the battery temperature are read in subsequent S220 from the current measurement circuit 62 and the temperature measurement circuit 66. In addition, in S220, not only that the measured values I and T are just read, but also the read measured values T and I of a plurality of past measurement results (in other words, measurement results obtained for a certain time) are respectively averaged, or the moving average thereof are calculated. In this way, the error component (in other words, the unnecessary noise component) of the measured values I and T obtained by the current measurement circuit 62 and the temperature measurement circuit 66 are removed.

Subsequently, in S230, based on the current measured values I and T obtained in the process of S220, an overcurrent counter add-subtract value C (hereinafter, referred to as an add-subtract value C) to update the counter value K is calculated. In subsequent S240, the calculated add-subtract value C is added to the current counter value K, in order to update the counter value K.

The counter value K is an example of a load information of the present invention, and also a value equivalent to a calorific value of the battery 50. Thus, the value can be said an estimate which indicates the calorific value of the battery 50.

In addition, in S230, the add-subtract value C to update the counter value K is calculated based on the discharge current I and the battery temperature T. For the calculation, for example, a plurality of maps are used.

Figure 8:
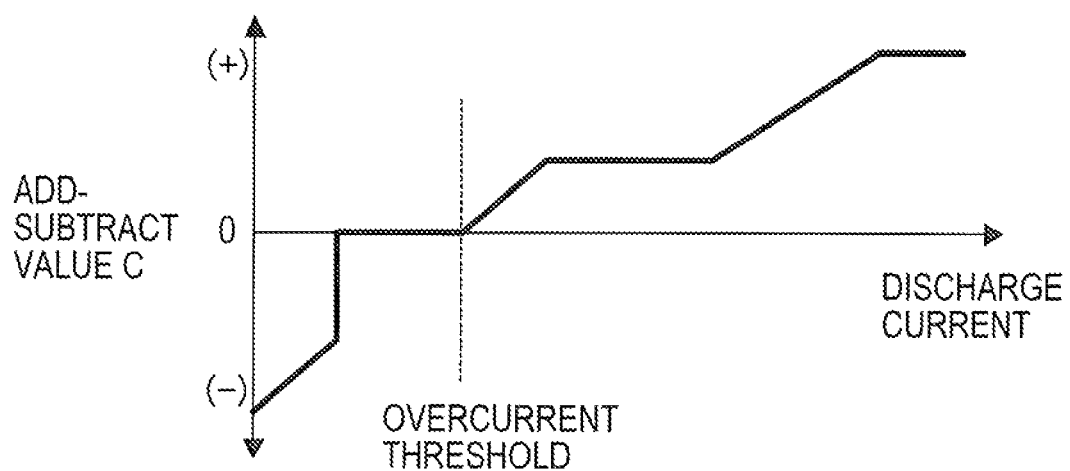
FIG. 8 is an explanatory diagram which explains operation of the discharge current limitation process of FIG. 7.

These plurality of maps are prepared for each predetermined temperature range of the battery 50. Each of the plurality of maps, for example, as shown in FIG. 8, is configured such that zero (0) or a negative value is set as the add-subtract value C if the measured value I is smaller than the overcurrent threshold, and a positive value is set as the add-subtract value C if the measured value I is equal to or larger than the overcurrent threshold. The MCU 70, in S230, selects one map corresponding to the measured value T, and, using the map, calculates the add-subtract value C corresponding to the measured value I.

All of these maps are configured, as illustrated in FIG. 8, to have a tendency such that the larger the measured value I is, the larger the add-subtract value C is. The map associated with the temperature range including high temperatures is set such that the add-subtract value C for the discharge current is larger than that of the map associated with the temperature range including low temperatures. This is because the battery 50 is easy to generate heat as the measured value I is larger, and the measured value T (surface temperature of the battery 50, and thus the ambient temperature, in detail) is easy to rise.

Upon calculating the add-subtract value C in S230, it is not always necessary to use the above maps. A two-dimensional map having parameters of the measured values I and T, or a formula F (I, T), having parameters of these values I and T may be used.

When the counter value K is updated in S240, it is determined in the subsequent S250 whether or not the updated counter value K is equal or larger than a first set value X1 for overcurrent determination.

Then, if the counter value K is equal to or larger than the first set value X1, it is determined that the internal temperature of the battery 50 has exceeded an allowable range, and the process proceeds to S260. Then, protection conditions are changed. More particularly, for example, changes are made such as raising each of the thresholds (cell voltage threshold and battery voltage threshold) for determining the above described overdischarged state of the battery 50, or lowering the temperature threshold used upon determining whether or not the overheated state is present in the battery temperature limitation process. In this way, discharge of the battery 50 is limited.

If it is determined in S250 that the counter value K is not equal to or larger than the first set value X1, the protection conditions are initialized in S310. The discharge current limitation process ends. Particularly, the initialization process is performed such as returning each of the above exemplified thresholds to their initial values.

On the other hand, if the protection conditions have been changed in S260, it is determined in the subsequent S270 whether or not the counter value K is equal to or larger than a second set value X2 which is larger than the first set value X1.

Then, if the counter value K is equal to or larger than the second set value X2, it is determined that the internal temperature of the battery 50 has reached a limit temperature which may lead to deterioration of the battery 50. The process then proceeds to S280. By shifting the discharge control signal from high level low high level, the discharge from the battery 50 is stopped. If it is determined in S270 that the counter value K is not equal to or larger than the second set value X2, the discharge current limitation process ends.

On the other hand, if the discharge is stopped in S280, it is determined in the subsequent S290 whether or not the counter value K is equal to or larger than a third set value X3 which is larger than the second set value X2. If the counter value K is equal to or larger than the third set value X3, it is determined that some abnormality has occurred to the battery 50 or the battery control circuit 60 and it is no longer desirable to allow the use of the battery pack 40. The discharge thereafter is completely prohibited. More specifically, a discharge prohibition flag is set. As long as the discharge prohibition flag is set, the MCU 70 performs control to permit neither of charge and discharge.

Then, if it is determined in S210 that the battery 50 is currently being charged, the process proceeds to S320. In S320, it is determined whether or not the counter value K of the battery 50 has reached the first set value X1 or the second set value X2 at the time of the previous discharge, and the protection conditions of the battery 50 are changed or the discharge is stopped.

Then, if the protection conditions of the battery 50 are changed or the discharge is stopped at the time of the previous discharge, it is determined that the internal temperature of the battery 50 is easy to rise. The process proceeds to S330. By sending a charging current limit signal to the MCU 96 of the charger 80, the upper limit of the charging current to the battery 50 is set lower than normal, to end the discharge prohibition determination process.

In addition, if it is determined in S320 that the protection conditions of the battery 50 are not changed or discharge is not stopped at the time of the previous discharge, the discharge prohibition determination process immediately ends.

(Effects of Embodiment)

As described above, in the battery pack 40 of the present embodiment, the five sleep-mode transition conditions are set as conditions for transition to the sleep mode. The battery pack 40, even if all of these conditions are satisfied, is not shifted to the sleep mode immediately by satisfaction of the conditions, and continues to operate normally until the predetermined time elapses. Then, when the all-condition satisfaction state which is the state wherein all the sleep-mode transition conditions are satisfied has continued for the predetermined period of time, the battery pack 40 shifts to the sleep mode.

Moreover, the sleep mode in the present embodiment does not completely shut down the power supply to the battery control circuit 60 (power supply to the MCU 70) to stop all its operation, but stops part of operation of the battery control circuit 60 (operation of the MCU 70) so that the minimal monitoring function is maintained. Thus, even during the sleep mode, it is possible to respond quickly to events of such as use of the body 12, charger connection, and an abnormality such as battery voltage drop.

Therefore, the battery pack 40 can shift to the sleep mode at timing appropriate to the usage of the battery pack 40. Thereby, power consumption in the battery pack 40 can be effectively reduced, while desired monitoring capabilities and the convenience of the user are maintained.

Figure 7:
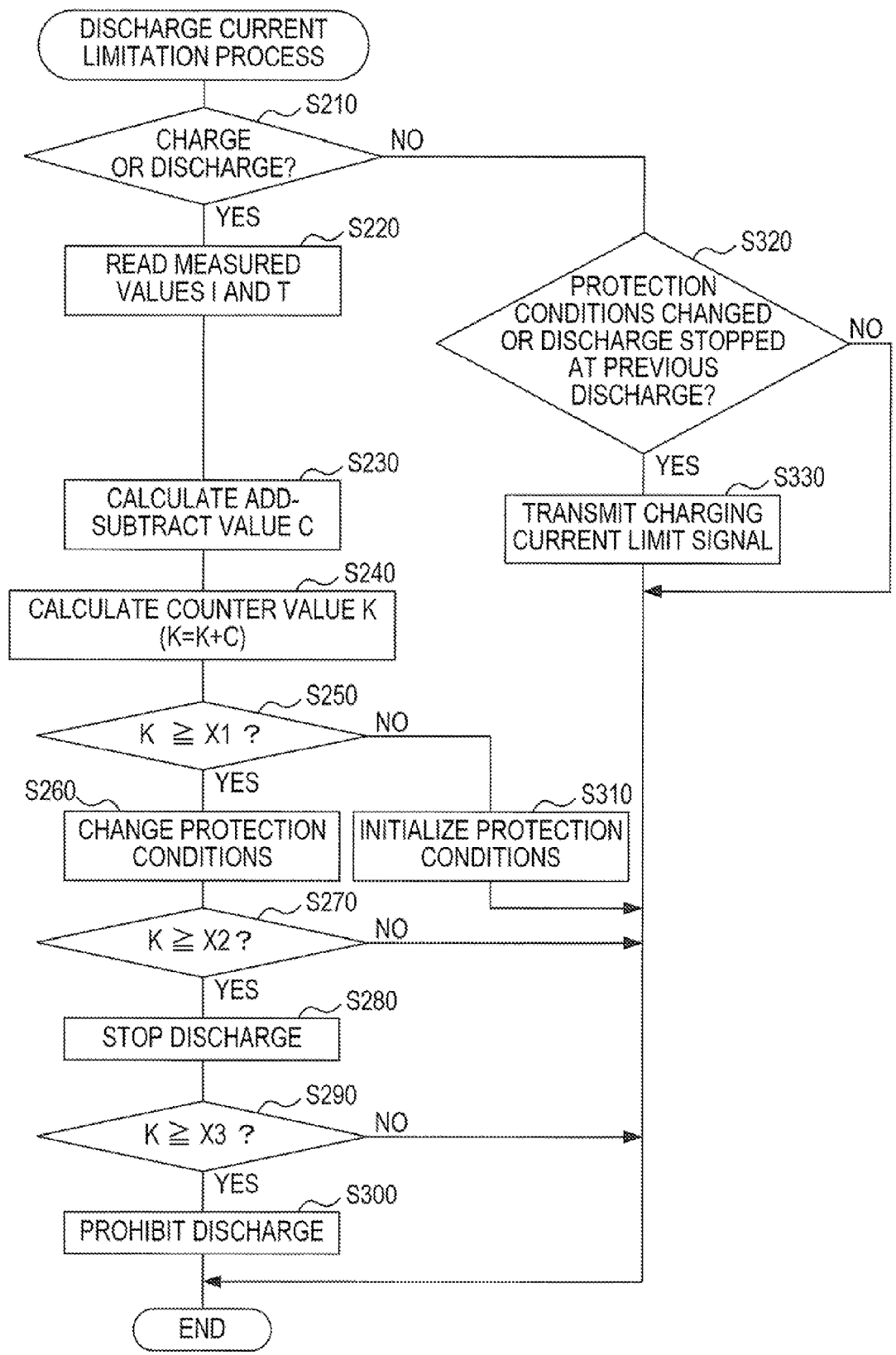
FIG. 7 is a flowchart showing a discharge current limitation process executed in the MCU of the battery pack.

In addition, in the present embodiment, the MCU 70 arranged in the battery pack 40 performs the discharge current limitation process shown in FIG. 7.

In this discharge current limitation process, the add-subtract value C is calculated periodically using the measured values I and T, at the time of discharge to the motor M1 from the battery pack 40. The counter value K is updated by the calculated add-subtract value C. Then, if the counter value K is equal to or larger than the first set value X1, a limit is set on the discharge of the battery 50 by changing the protection conditions (to be more severe conditions). If the counter value K is equal to or larger than the second set value X2, the discharge from the battery 50 is stopped. Further, if the counter value K is equal to or larger than the third set value X3, the discharge from the battery 50 is prohibited (S250 to S300).

In this way, in the present embodiment, the counter value K is updated periodically by using the add-subtract value C calculated from the measured value I, using the map shown in FIG. 8.

Also, in the present embodiment, the discharge from the battery 50 is limited, stopped, or prohibited, based on the counter value K. Thus, without unnecessarily limiting the discharge, etc., it is possible to protect the battery 50.

[Modification]

In the above, an embodiment of the present invention has been described. It goes without saying that the embodiment of the present invention is not limited to the above-described embodiment, and can take a variety of forms within the technical scope of the present invention.

For example, in the above-described embodiment, the above five conditions (a) to (e) are set as a condition to make transition to the sleep mode. However, each of these conditions is only an example. How many conditions to set and what conditions to set can be determined as required.

In addition, for the overloaded state which is one of the sleep-mode transition conditions, it is determined that the overloaded state is not detected if the counter value K is zero (0) in the above-described embodiment. However, to determine that the overloaded state is not detected when the counter value K is zero (0) is only an example. For example, the overload determination threshold which is larger than zero (0) (or smaller than zero (0)) may be set. If the counter value K is equal to or smaller than the overload determination threshold, it may be determined that the overloaded state is not detected, i.e., the overloaded state is not present.

In the above-described embodiment, it is described that the counter value K is calculated, using the measured values I and T. However, it is also possible to calculate the add-subtract value C only using the measured value I.

In the above-described embodiment, it is described that, in accordance with the counter value K, change of the protection conditions, stopping the discharge, and prohibition of the discharge are performed in stages. However, only performing any one or two of these can also protect the battery 50 in a favorable manner, as compared to a conventional battery pack.

In the above-described embodiment, it is described that the battery 50 is a lithium-ion rechargeable battery. This is only an example. The battery 50 may be other rechargeable battery such as a nickel-hydrogen rechargeable battery, a nickel cadmium battery, and others.

In the above-described embodiment, a driver drill is described as an example for the body of the electric power tool to which the battery pack is connected. However, the present invention may be applied to electric power tools other than a driver drill.

In the body of the electric power tool of the above described embodiment, a brushed direct current motor is used as the motor M1. Instead, a brushless direct current motor and alternate current motor may be used. However, in the case of using a brushless direct current motor and alternate current motor as the motor M1, the body 12 is needed to be configured to be able to drive control these motors.

In addition, each of the transistors in the above described embodiment is a bipolar transistor or MOSFET. Switching elements other than these may be used for the transistors.

In addition, the MCU 70, 96 in the above-described embodiment may be an ASIC (Application Specific Integrated Circuits), a programmable logic device, such as an FPGA (Field Programmable Gate Array), etc., or a discrete circuit.

In addition, the programs of the sleep-mode transition determination process and discharge current limitation process may be used by being recorded on a recording medium readable by the CPU 701. The recording medium, for example, includes a flexible disk (FD), an optical disk (MO), a DVD, a CD-ROM, a Blu-Ray disc, a HD-DVD, a hard disk, a portable semiconductor memory (USB memory, memory card, for example), and so on.

The invention claimed is:

1. A battery pack for electric power tool which is configured to supply electric power to a body of the electric power tool, the battery pack comprising:
    a battery that has at least one battery cell; and
    a control circuit that is configured to operate by electric power of the battery and has a function to monitor at least a state of the battery, the control circuit including:
        a condition satisfaction determination unit that is configured to determine whether or not each of a plurality of sleep-mode transition conditions is satisfied, and also to determine whether or not an all-condition satisfaction state is present, which is a state wherein all of the plurality of sleep-mode transition conditions are satisfied, the plurality of sleep-mode transition conditions including all of conditions (a) to (e) below:
            (a) a charger unconnected state is present, which is a state wherein the battery pack is not connected to a charger for charging the battery;
            (b) a non-discharging state is present, which is a state wherein a discharge current is not flowing from the battery to the body of the electric power tool;
            (c) a charging unexecuted state is present, which is a state wherein a charging current for charging the battery is not flowing;
            (d) an operation switch-off state is present, which is a state wherein an operation switch that is provided in the body of the electric power tool on which the battery pack is attached and which operates by receiving power supply from the battery, and that is externally operated in order to operate or stop the body of the electric power tool, is turned off; and
            (e) an overloaded state is not present, which is a state wherein there is a risk that overcurrent which is equal to or larger than a predetermined overcurrent threshold may flow from the battery to the body of the electric power tool when the operation switch is turned on;
        a continuity satisfaction determination unit that is configured to determine whether or not the all-condition satisfaction state has continued for a predetermined period of time when it is determined by the condition satisfaction determination unit that the all-condition satisfaction state is present; and
        a sleep-mode transition unit that is configured to stop part of operation of the control circuit thereby to shift the control circuit to a sleep mode when it is determined by the continuity satisfaction determination unit that the all-condition satisfaction state has continued for the predetermined period of time.

2. The battery pack according to claim 1, wherein
    the charger is configured to output a charger signal which indicates that the charger is in a state wherein the charger can supply electric power at least for charging to the battery pack, when the charger is in the state,
    the battery pack includes a charger signal input terminal that is configured to input the charger signal outputted from the charger,
    the control circuit includes a charger signal input detection unit that is configured to detect an input of the charger signal to the charger signal input terminal,
    the condition satisfaction determination unit is configured to determine that the charger unconnected state is present and at least the condition (a) is satisfied when an input of the charger signal is not detected by the charger signal input detection unit.

3. The battery pack according to claim 1, wherein
the control circuit includes a discharge current detection unit that is configured to detect the discharge current from the battery, and
the condition satisfaction determination unit is configured to determine that the non-discharging state is present when the discharge current is not detected by the discharge current detection unit.

4. The battery pack according to claim 1, wherein
the control circuit includes a charging current detection unit that is configured to detect the charging current to the battery, and
the condition satisfaction determination unit is configured to determine that the charging unexecuted state is present when the charging current is not detected by the charging current detection unit.

5. The battery pack according to claim 1, wherein
the body of the electric power tool is configured to be able to output an operation signal indicating the operation state of the operation switch,
the battery pack includes an operation signal input terminal that is configured to input the operation signal outputted from the body of the electric power tool,
the control circuit includes an operation signal detection unit that is configured to detect the operation signal inputted to the operation signal input terminal,
the condition satisfaction determination unit is configured to determine the operation state of the operation switch based on the operation signal detected by the operation signal detection unit, and to determine that the operation switch-off state is present when it is determined that the operation switch is turned off.

6. The battery pack according to claim 1, wherein
the control circuit includes:
  a discharge current detection unit that is configured to detect the discharge current from the battery;
  an overcurrent determination unit that is configured to determine whether or not the discharge current detected by the discharge current detection unit is equal to or larger than the overcurrent threshold at predetermined timing; and
  a load information generation unit that is configured to generate load information indicating whether or not the overloaded state is present based on a result of the determination by the overcurrent determination unit, each time the determination by the overcurrent determination unit is made, and
the condition satisfaction determination unit is configured to determine whether or not the overloaded state is present based on the load information generated by the load information generation unit.

7. A battery pack for electric power tool which is configured to supply electric power to a body of the electric power tool, the battery pack comprising:
a battery that has at least one battery cell; and
a control circuit that is configured to operate by electric power of the battery and has a function to monitor at least a state of the battery, the control circuit including:
  a condition satisfaction determination unit that is configured to determine whether or not each of at least one sleep-mode transition condition is satisfied, and also to determine whether or not an all-condition satisfaction state is present, which is a state wherein all of the at least one sleep-mode transition condition are satisfied, the at least one sleep-mode transition condition including a condition wherein an overloaded state is not present, which is a state wherein there is a risk that overcurrent which is equal to or larger than a predetermined overcurrent threshold may flow from the battery to the body of the electric power tool when an operation switch that is provided in the body of the electric power tool on which the battery pack is attached and which operates by receiving power supply from the battery, and that is externally operated in order to operate or stop the body of the electric power tool, is turned on;
  a continuity satisfaction determination unit that is configured to determine whether or not the all-condition satisfaction state has continued for a predetermined period of time when it is determined by the condition satisfaction determination unit that the all-condition satisfaction state is present;
  a sleep-mode transition unit that is configured to stop part of operation of the control circuit thereby to shift the control circuit to a sleep mode when it is determined by the continuity satisfaction determination unit that the all-condition satisfaction state has continued for the predetermined period of time;
  an overcurrent determination unit that is configured to periodically determine whether or not the discharge current detected by the discharge current detection unit is equal to or larger than the overcurrent threshold; and
  a load information generation unit that is configured to generate load information indicating whether or not the overloaded state is present based on a result of the determination by the overcurrent determination unit, each time the determination by the overcurrent determination unit is made, wherein
the condition satisfaction determination unit is configured to determine whether or not the overloaded state is present based on the load information generated by the load information generation unit,
the control circuit further includes an add-subtract value setting unit that is configured to set a negative add-subtract value including zero (0) of which absolute value becomes larger as the discharge current is smaller when it is determined by the overcurrent determination unit that the discharge current is not equal to or larger than the overcurrent threshold, and to set a positive add-subtract value which becomes larger as the discharge current is larger when it is determined by the overcurrent determination unit that the discharge current is equal to or larger than the overcurrent threshold,
the load information generation unit is configured to cumulatively add the add-subtract value set by the add-subtract value setting unit based on a result of the determination, thereby to generate a result of the addition as the load information, each time the determination by the overcurrent determination unit is made, and
the condition satisfaction determination unit is configured to determines that the overloaded state is not present when the result of the addition as the load information generated by the load information generation unit is equal to or smaller than a predetermined overload determination threshold.

* * * * *